July 1, 1958     D. T. GILMORE     2,841,339
DEHYDRATING AND PULVERIZING MACHINE
Filed March 25, 1954     2 Sheets-Sheet 1

INVENTOR
DALE T. GILMORE
BY Philip H. Sheridan
ATTORNEY

July 1, 1958  D. T. GILMORE  2,841,339
DEHYDRATING AND PULVERIZING MACHINE
Filed March 25, 1954  2 Sheets-Sheet 2

INVENTOR
DALE T. GILMORE

BY  Philip H. Sheridan
ATTORNEY

United States Patent Office 2,841,339
Patented July 1, 1958

2,841,339

DEHYDRATING AND PULVERIZING MACHINE

Dale T. Gilmore, Andrews, Tex.

Application March 25, 1954, Serial No. 418,575

3 Claims. (Cl. 241—54)

This apparatus relates to a combined dehydrating and pulverizing machine particularly adapted for producing powder from any type of solids that are suspended in liquid wherein the solids are retained and the liquid is evaporated and discarded.

An object of the invention is to provide an apparatus which is particularly adapted to dehydrate virus culture in chick embryo at temperatures ranging from about 40 to 60° F.

Another object is to dry solids in liquid solution at reduced temperatures in order not to subject the mixture to excessive heat; i. e., to dry the same at low temperatures.

A further object is to provide an apparatus of this type that will subject the liquid having suspended solids in it to a drying operation and to a powdering operation in the same receptacle.

Yet another object is to provide an apparatus which includes a rotating drum in which the solution is placed, which drum may be continuously rotated during the drying, and the pulverizing operations.

A further object is to provide an apparatus of the type describe wherein the liquid during drying and/or pulverizing is subjected to a current of filtered gas, such as air, which has been chilled and pre-dried, and which has been subjected to filter action.

Other objects will appear hereinafter throughout the specification.

Figure 1:
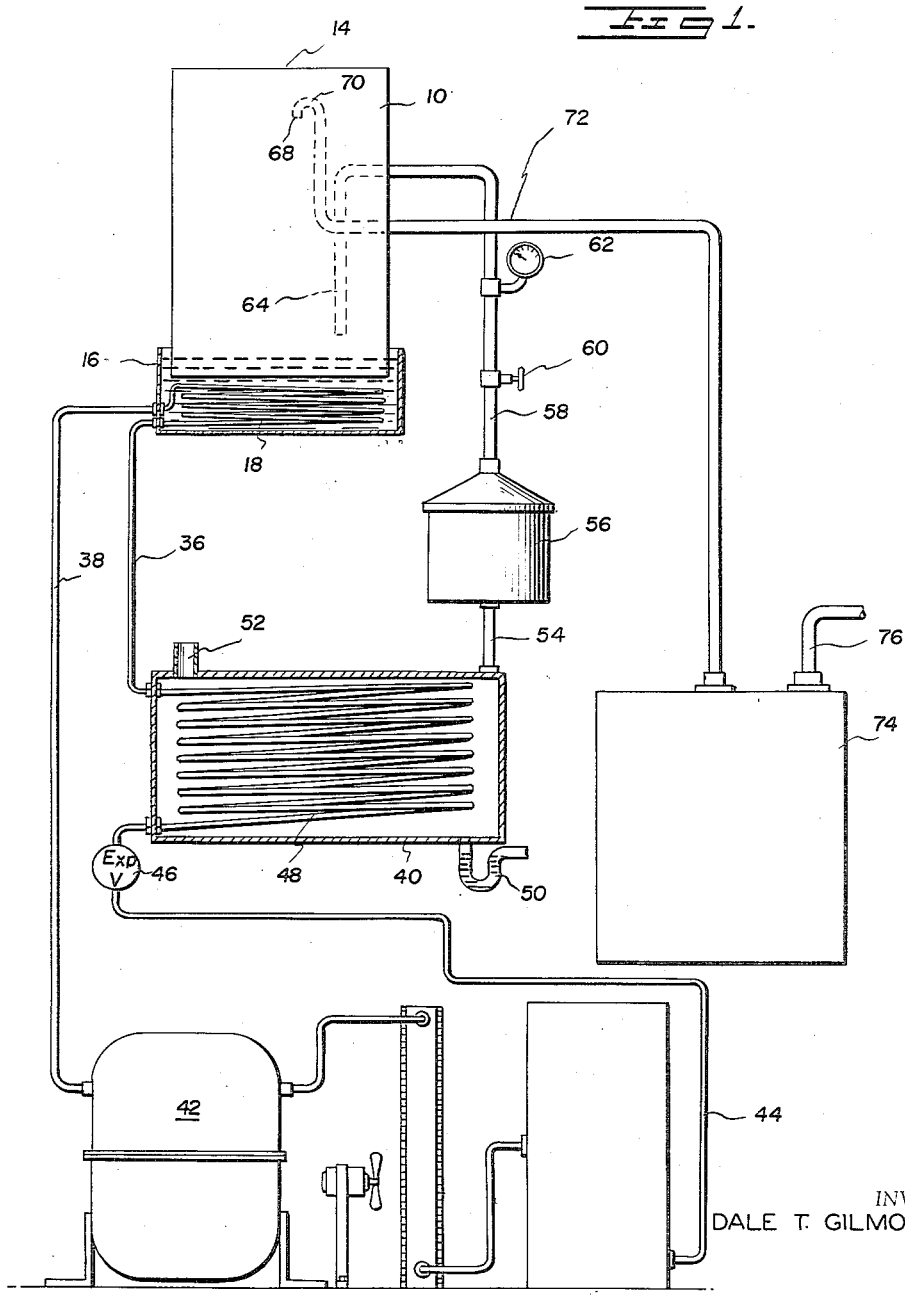
Figure 1 is a side elevational diagrammatic view of the apparatus with the air drying chamber shown in section.

The apparatus hereinafter described is used for processing liquids containing solids, and it is especially adapted for dehydrating virus cultures in chick embryo, or for similar operations. As presently operated by way of example, the apparatus will dehydrate about two gallons of fluid in substantially sixty hours and at a reduced temperature of from about 40 to 60° F.

Referring to the drawings, the numeral 10 indicates a combined evaporating drum and ball mill. This drum is provided with an interior space 12, and its lower periphery 14 is immersed within the tank 16 which contains a liquid such as water, which is chilled by means of the coil 18 shown in Figure 1.

The drum is slowly driven by a back-geared motor 20 by means of the belt and pulley arrangement designated generally by the numeral 22. The drum 10 is rotatably supported by the stanchion 24 and the parts heretofore described are mounted on a suitable support or stand 26.

Figure 2:
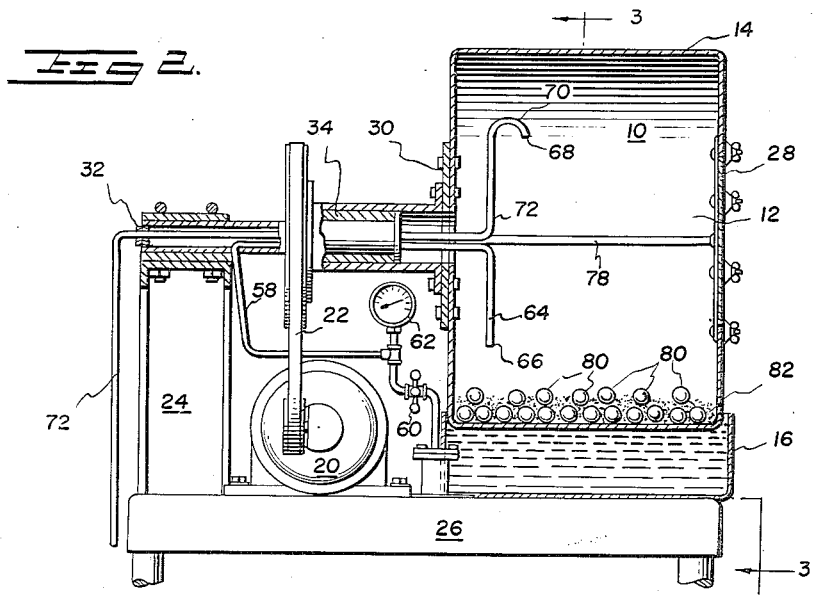
Figure 2 is an enlarged side elevation of the drum, its mounting, and means for driving the same.

It will be appreciated that the interior of the drum is sealed by the plates or covers 28 and 30 and by the seal 32. The numeral 34 indicates a spool bearing for rotatably supporting the drum, as seen in Figure 2.

Coil 18 is connected by pipes 36 and 38 respectively to the interior of the air drying chamber 40 and to refrigerating unit 42. The exit pipe 44 of the refrigerating unit 42 has an expansion valve 46 beyond which the pipe extends into the air drying chamber 40 and is connected to a coil 48. As seen in Figure 1, pipe 36 is connected to the opposite end of this coil.

The air drying chamber is shown with a water drain 50, an air inlet 52 and an exit 54 for chilled air which leads to the air filter shown diagrammatically at 56.

The pipe 58 which carries filtered air away from the filter 56 is provided with a needle valve 60 and a vacuum gauge 62 from which the pipe extends into the drum 10, wherein it is provided with a down-turned end 64. Continuously dried and filtered air enters the drum from the exit 66, and moisture-laden air is removed from the drum interior. Such air enters opening 68 of the U-bend 70 forming part of the exit pipe 72. This pipe enters the vacuum pump 74 and air is discharged therefrom through pipe 76.

The vacuum pump supplies, during the operation of the machine, a pull through pipe 72 to the interior of the drum 14. The lowered pressure within this drum causes the movement of air through inlet 52, air drying chamber 40, air filter 56, and pipe 58 to the interior of the drum.

Figure 3:
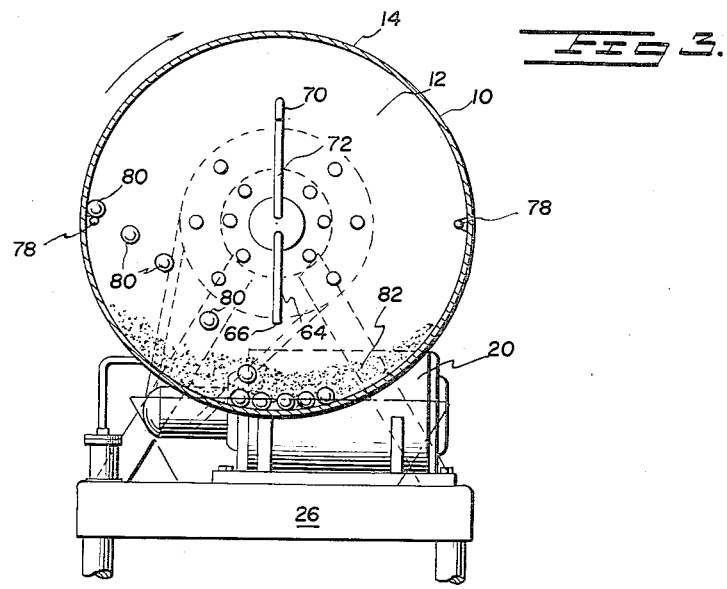
Figure 3 is a sectional view taken on the line 3—3 of Fig. 2.

Preferably, the drum is provided with rods 78 of suitable material, such as stainless steel, shown in Figure 3 as two in number, although any number of said rods may be used in spaced relationship from each other. These rods are rigidly attached inside the drum axially thereof. In a typical installation, the rods would measure about one-half inch in diameter and provide a space of about three-eighths of an inch from the interior periphery of the drum. The drum is provided with a plurality of balls 80, and as the drum revolves, the rods tend to agitate the balls and carry some of them up the drum a certain distance from which they are dropped as the drum continues to revolve, onto the material being dried. As seen in Figures 2 and 3, the material is indicated at 82. The agitation of the balls and the dropping of them onto the material as the drum revolves results in a much more satisfactory powdering action, and prevents the material being processed from balling up and rolling in front of the balls, thereby preventing the latter from having their maximum effect on the material within the rotating drum. The plate 28, as seen in Figure 2, is preferably composed of laminated glass in order that the material being processed may be observed at all times.

As the drum revolves, its exterior periphery continually dips in the refrigerating bath. This is due to the fact that the water within the tank 16 is continually chilled by means of coil 18 which is in series with coil 48, both of which form the evaporators of refrigerating unit 42. The drum temperature keeps the material inside the drum at approximately the same temperature as that maintained in the refrigerating bath by coil 18.

It will be noted that applicant's cooling means in the form of tank 16 and the coil 18 which is immersed within the liquid bath contained within the tank results in the lower peripheral portion of drum 10 being partially enclosed during drum rotation by the cooling means. It will also be noted that coil 48 in air drier 40 is in series with the coil 18 within tank 16, with coil 48 being immediately adjacent the expansion valve 46, and coil 18 being in immediate connection with the suction side of the compressor of the refrigerating unit 42. This latter arrangement is advantageous and critical as it provides minimum air temperature in the drum 10 as compared to water temperature in the liquid bath within tank 16.

*Operation*

The liquid containing solids 82 is placed in the evaporating drum and ball mill, and the plates or covers 28 and 30 are securely fastened to the drum. The air within the drum is continuously dried by mechanical refrigeration and filter action as it passes through the air drying chamber 40, and filter 56. As the air from pipe 58 enters from the end 66 within the same, the drum is continuously slowly rotated while being chilled by the water in tank 16. It will be noted by reference to Figure 2 that the material 82 is located continuously during the drum rotation, in heat exchange relationship with the lowermost portion of the drum periphery, which latter is at this time immersed in the bath of chilled liquid. As the operation proceeds, air is continuously removed through opening 68 of pipe 72 by means of the vacuum pump 74, which latter also provides the means for completing the circulation of air through air drying chamber 40 and air filter 56 to the drum interior.

As the operation proceeds, the moisture is gradually removed, leaving only solids which are pulverized by the action of the balls 80 as they roll over the material and against each other, and drop from an elevated position by one of the rods 78 as seen in Figure 3.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. Apparatus for dehydrating and pulverising solids immersed in liquids comprising a hollow drum for receiving the liquid containing solids, an air drying chamber having an inlet for air to be dried and an outlet for dried air, means for supplying the dried air from the chamber to the drum and for withdrawing moisture laden air from the drum, said drum being supported for rotation so that solids within the drum continually locate during rotation at the lower part of the drum, and means for cooling the drum comprising a liquid bath tank partially enclosing the lowest peripheral portion of the lower part of the drum whereby the solids within the drum during rotation are continually immediately adjacent the cooling means.

2. Apparatus as defined in claim 1 wherein there is provided a refrigerating unit including first and second refrigerant containing coils connected in series and an expansion valve, the first coil being located in the air drying chamber and the second coil being located in the liquid bath of the tank with the first coil being immediately adjacent the expansion valve and the second coil being in immediate connection with the suction side of the compressor of the refrigerating unit.

3. Apparatus as defined in claim 2 wherein there is provided an air filter interposed in the supply means from the chamber to the drum, said drum containing a plurality of freely agitatable balls and at least two spaced rods secured to the interior of the drum for agitating the balls as the drum rotates.

References Cited in the file of this patent

UNITED STATES PATENTS

| | | |
|---|---|---|
| 1,303,682 | Kermer | May 13, 1919 |
| 1,313,939 | Dietrich | Aug. 26, 1919 |
| 1,610,345 | Williams | Dec. 14, 1926 |
| 1,730,902 | Rugh | Oct. 8, 1929 |
| 1,803,821 | Witte | May 5, 1931 |
| 2,064,084 | Sando | Dec. 15, 1936 |
| 2,067,043 | Caldwell | Jan. 5, 1937 |
| 2,346,101 | Bright | Apr. 4, 1944 |
| 2,400,382 | Arnold | May 14, 1946 |
| 2,411,152 | Folsom | Nov. 19, 1946 |
| 2,470,315 | McGehee | May 17, 1949 |
| 2,471,035 | Hurd | May 24, 1949 |
| 2,477,959 | Brown | Aug. 2, 1949 |